(12) United States Patent
Bookbinder et al.

(10) Patent No.: US 11,287,568 B2
(45) Date of Patent: Mar. 29, 2022

(54) WIDEBAND MULTIMODE CO-DOPED OPTICAL FIBER EMPLOYING GEO$_2$ AND AL$_2$O$_3$ DOPANTS

(71) Applicant: CORNING INCORPORATED, Corning, NY (US)

(72) Inventors: Dana Craig Bookbinder, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/239,923

(22) Filed: Apr. 26, 2021

(65) Prior Publication Data

US 2021/0239900 A1    Aug. 5, 2021

Related U.S. Application Data

(62) Division of application No. 16/561,394, filed on Sep. 5, 2019, now Pat. No. 11,022,750.

(Continued)

(51) Int. Cl.
*G02B 6/028* (2006.01)
*G02B 6/036* (2006.01)
*C03C 13/04* (2006.01)

(52) U.S. Cl.
CPC ......... *G02B 6/0288* (2013.01); *G02B 6/0365* (2013.01); *C03C 13/046* (2013.01)

(58) Field of Classification Search
CPC .... G02B 6/0288; G02B 6/0365; C03C 3/083; C03C 13/046
See application file for complete search history.

(56) References Cited

U.S. PATENT DOCUMENTS 4,111,525 A    9/1978   Kaminow et al.
4,222,631 A    9/1980   Olshansky
(Continued)

OTHER PUBLICATIONS

Ming-Jun Li et al., "Al/Ge co-doped large mode area fiber with high SBS threshold," Opt. Express 15, 8290-8299 (2007). (Year:2007).

(Continued)

*Primary Examiner* — Daniel Petkovsek
(74) *Attorney, Agent, or Firm* — Kevin L. Bray

(57) ABSTRACT

The wideband multimode co-doped optical fiber has a silica core co-doped with GeO$_2$ and Al$_2$O$_3$. The GeO$_2$ concentration is maximum at the fiber centerline and monotonically decreases radially out to the core radius. The Al$_2$O$_3$ concentration is minimum at the centerline and monotonically increases radially out to maximum concentration at the core radius. The cladding has an inner cladding region of relative refractive index Δ2, an intermediate cladding region having a relative refractive index Δ3, and an outer cladding region having a relative refractive index Δ4, wherein Δ3<Δ2, Δ4. The optical fiber has a bandwidth BW≥5 GHz·km with a peak wavelength λ$_P$ within a wavelength range of 800 nm to 1200 nm and over a wavelength band Δλ of at least 100 nm.

4 Claims, 9 Drawing Sheets

Related U.S. Application Data

(60) Provisional application No. 62/730,671, filed on Sep. 13, 2018.

(56) References Cited

U.S. PATENT DOCUMENTS

| | | |
|---|---|---|
| 4,339,174 A | 7/1982 | Levin |
| 6,201,918 B1 | 3/2001 | Berkey et al. |
| 7,088,900 B1 | 8/2006 | Mishra |
| 7,313,312 B2 | 12/2007 | Kimball et al. |
| 7,315,677 B1 | 1/2008 | Li et al. |
| 7,421,174 B2 | 9/2008 | Fleming et al. |
| 7,787,731 B2 | 8/2010 | Bookbinder et al. |
| 8,009,950 B2 | 8/2011 | Molin et al. |
| 8,588,568 B2 | 11/2013 | Bookbinder et al. |
| 8,644,664 B2 | 2/2014 | Molin et al. |
| 8,794,038 B2 | 8/2014 | Matthuse et al. |
| 8,965,163 B2 | 2/2015 | Bookbinder et al. |
| 9,804,325 B2 | 10/2017 | Balemarthy |
| 11,022,750 B2 * | 6/2021 | Bookbinder ......... G02B 6/0365 |
| 2016/0304392 A1 | 10/2016 | Bookbinder et al. |

OTHER PUBLICATIONS

R. Olshansky, "Mode Coupling Effects in Graded-Index Optical Fibers", Applied Optics vol. 14, pp. 935-945, 1975.

R. Olshansky, "MULTIPLE-a Index Profile", Applied Optics, vol. 18, pp. 683-689, 1979.

SWDM Announcements, Papers, and Presentations"; Downloaded Nov. 14, 2019; 1 Page".

Tatum et al., "VCSEL-Based Interconnects for Current and Future Data Centers", J. Lightwave Technol., 33 (4), pp. 727-732, (2015).

TIA Standard, TIA-492AAAE, "Detail Specification For 50-m Core Diameter/125-m Cladding Diameter Class 1A Graded-Index Multimode Optical Fibers With Laser-Optimized Bandwidth Characteristics Specified for Wavelength Division Multiplexing," (2016), 42 Pages.

Wang; "Alumina as a Dopant in Optical Fiber By OVD"; Appl. Phys. A (2014) 116: 505-518.

* cited by examiner

WIDEBAND MULTIMODE CO-DOPED OPTICAL FIBER EMPLOYING GEO₂ AND AL₂O₃ DOPANTS

This application is a divisional of and claims the benefit of priority of U.S. patent application Ser. No. 16/561,394, filed on Sep. 5, 2019, which claims the benefit of priority to U.S. Provisional Application Ser. No. 62/730,671 filed on Sep. 13, 2018, the contents of which are relied upon and incorporated herein by reference in their entirety.

FIELD

The present disclosure relates to optical fibers, and in particular to a co-doped wideband multimode optical fiber employing $GeO_2$ and $Al_2O_3$ dopants.

BACKGROUND

Multimode optical fiber is used extensively in optical telecommunications for local area networks (LANs) and in data centers due to its relatively large data-carrying capacity (bandwidth), and in particular its ability to carry optical signals at different optical wavelengths via wavelength division multiplexing (WDM). Different types of multimode fibers used in optical telecommunications include OM1, OM2, OM3 and OM4 types, with the OM4 type being widely used for 10 Gigabit (G), 40G and 100G Ethernet for data centers, financial centers and corporate campuses.

Short wavelength division multiplexing (SWDM) has been proposed to increase MMF capacity by utilizing four wavelength channels in the wavelength range between 850 and 950 nm (e.g., 850 nm, 880 nm, 910 nm and 940 nm). Unfortunately, the standard OM4 fiber is not suitable due its limited wavelength band so that a wideband multimode fiber is required.

Manufacturing a suitable (i.e., commercially viable) wideband multimode fiber using Ge doping alone is more difficult than manufacturing the standard OM4 optical fiber because much tighter profile control is required to achieve the peak bandwidths over the required wavelength band.

SUMMARY

An example of the wideband multimode co-doped optical fiber disclosed herein has a silica core co-doped with $GeO_2$ and $Al_2O_3$. The $GeO_2$ concentration is maximum at the fiber centerline and monotonically decreases radially out to the core radius. The $Al_2O_3$ concentration is minimum at the centerline and monotonically increases radially out to maximum concentration at the core radius. The cladding has an inner cladding region of relative refractive index $\Delta 2$, an intermediate cladding region having a relative refractive index $\Delta 3$, and an outer cladding region having a relative refractive index $\Delta 4$, wherein $\Delta 3 < \Delta 2$, $\Delta 4$. The optical fiber has a bandwidth BW≥5 GHz·km with a peak wavelength $\lambda_P$ within a wavelength range of 800 nm to 1200 nm and over a wavelength band $\Delta\lambda$ of at least 100 nm.

An embodiment of the disclosure is directed to a wideband multimode co-doped optical fiber having a centerline and that comprises: a core of radius r1 and comprising silica and co-doped with a first concentration of $GeO_2$ and a second concentration of $Al_2O_3$, wherein the first concentration of $GeO_2$ has a first maximum concentration at the centerline and monotonically decreases radially out to the radius r1 and wherein the second concentration of $Al_2O_3$ has a minimum at the centerline and monotonically increases radially out to a second maximum concentration at the radius r1, wherein the first maximum concentration is in a range from 5 wt % to 25 wt % and the second maximum concentration is in a range from 1 wt % to 10 wt %; a cladding immediately surrounding the core and comprising silica, the glass cladding having an inner cladding region of relative refractive index $\Delta 2$, an intermediate cladding region having a relative refractive index $\Delta 3$, and an outer cladding region having a relative refractive index $\Delta 4$, wherein $\Delta 3_{MIN} < \Delta 2, \Delta 4$; and a wavelength band $\Delta\lambda$ of at least 100 nm, the wavelength band $\Delta\lambda$ having a peak wavelength $\lambda_P$ in a wavelength range from 800 nm to 1200 nm and a bandwidth BW≥5 GHz·km.

Another embodiment of the disclosure is directed to a wideband multimode co-doped optical fiber having a centerline used to measure a radial coordinate r and comprising: a core having an outer edge and comprising silica and co-doped with a first radially varying concentration of $GeO_2$ that decreases with the radial coordinate r out to the outer edge and a second radially varying concentration of $Al_2O_3$ that increases with the radial coordinate r out to the outer edge, wherein the core has gradient relative refractive index $\Delta 1(r)$ defined by the first and second varying dopant concentrations and with a maximum value $\Delta 1_{MAX}$ in the range from $0.5\% \leq \Delta 1_{MAX} \leq 2\%$; a cladding immediately surrounding the core and comprising silica, the cladding having an inner cladding region of relative refractive index $\Delta 2$, an intermediate cladding region having a relative refractive index $\Delta 3$ with a minimum value $\Delta 3_{MIN}$, and an outer cladding region having a relative refractive index $\Delta 4$, wherein the intermediate cladding region comprises a moat, wherein $\Delta 3_{MIN} < \Delta 2, \Delta 4$, and wherein $-0.7\% \leq \Delta 3_{MIN} \leq -0.1\%$; and a wavelength band $\Delta\lambda$ of at least 100 nm having a peak wavelength $\lambda_P$ in a wavelength range from 800 nm to 1200 nm and a bandwidth BW≥5 GHz·km.

Another embodiment of the disclosure is directed to a method of forming a wideband multimode co-doped optical fiber. The method comprises: a) forming a preform comprising: i) a preform co-doped core having a preform core outer edge and comprising silica and co-doped with a first radially varying concentration of $GeO_2$ that decreases with the radial coordinate r out to the preform core outer edge and a second radially varying concentration of $Al_2O_3$ that increases with the radial coordinate r out to the preform core outer edge; ii) a preform cladding immediately surrounding the preform co-doped core and comprising silica, the preform cladding having an inner preform cladding region of relative refractive index $\Delta 2$, an intermediate preform cladding region having a relative refractive index $\Delta 3$ with a minimum value $\Delta 3_{MIN}$, and an outer preform cladding region having a relative refractive index $\Delta 4$, wherein the intermediate cladding region comprises a moat and wherein $\Delta 3_{MIN} < \Delta 2, \Delta 4$; and b) drawing the preform to form the wideband multimode co-doped optical fiber comprising a co-doped fiber core defined by the preform co-doped core and having an outer edge and a diameter in a range from 20 microns to 70 microns and having said first and second radially varying concentrations of $GeO_2$ and $Al_2O_3$ out to the core outer edge, and a fiber cladding surrounding the co-doped fiber core and defined by preform cladding and having a fiber inner cladding region of relative refractive index $\Delta 2$, a fiber intermediate cladding region having a relative refractive index $\Delta 3$ with a minimum value $\Delta 3_{MIN}$, and a fiber outer cladding region having a relative refractive index $\Delta 4$, wherein the fiber intermediate cladding region comprises a moat and wherein $\Delta 3_{MIN} < \Delta 2, \Delta 4$; and c) wherein the wideband multimode co-doped optical fiber has a wavelength band Δλ of at least 100 nm having a peak wavelength $\lambda_P$ in a wavelength range from 800 nm to 1200 nm and a bandwidth BW≥5 GHz·km.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures.

DETAILED DESCRIPTION

Figure 1:
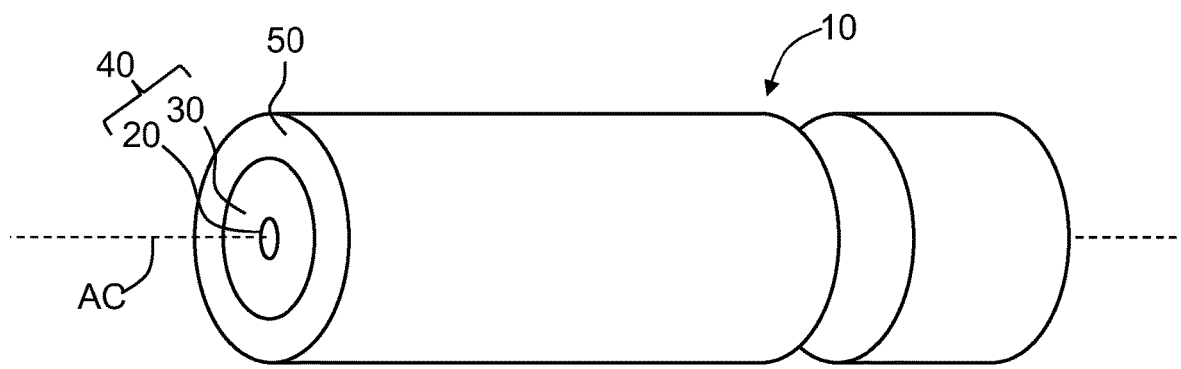
FIG. 1 is a front isometric view of an example co-doped wideband multimode optical fiber as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Definitions and Terms

Any relative terms like top, bottom, side, horizontal, vertical, etc., are used for convenience and ease of explanation and are not intended to be limiting as to direction or orientation.

The limits on any ranges cited herein are considered to be inclusive and thus to lie within the range, unless otherwise specified.

The expression "A/B/C microns" such as "50/125/250 microns is shorthand notation to describe the configuration of an optical fiber, where A is the diameter of the core in microns, B is the diameter of the core and cladding (i.e., glass section, as described below) of the optical fiber in micron, and C is the diameter of the coated optical fiber (i.e., core and cladding and non-glass protective coating) in microns.

The term "bandwidth" is denoted BW and as the term is used herein is the effective modal bandwidth (EMB) and is expressed as the bandwidth-distance product and is a measure of the amount of data (e.g., Gbit/s) that can be carried by an optical fiber over a given distance and is expressed herein in units of either GHz·km or MHz·km and is typically measured at a given transmission wavelength.

The "wavelength band" is denoted Δλ and is the wavelength range or span over which a select minimum bandwidth BW is maintained. For example, it can be said that a wavelength band Δλ for a given bandwidth BW extends from a lower wavelength $\lambda_L$=800 nm to an upper wavelength $\lambda_U$=1000 nm or it can be said that the same wavelength band $\Delta\lambda = \lambda_U - \lambda_L$=200 nm, and it will be apparent by the context of the discussion as to which use of this terminology applies. In an example, the select minimum bandwidth BW can be a standard bandwidth known in the art for the given application (e.g., 2.47 GHz·km for example SWDM applications).

The peak wavelength $\lambda_P$ is the wavelength at which the optical fiber has the greatest (highest) bandwidth within a wavelength band.

The coordinate r is a radial coordinate, where r=0 corresponds to the centerline of the optical fiber.

The term "ramp up" with respect to dopant concentration in the core section of the co-doped fiber means a monotonically increasing concentration from the centerline and moving radially outward to the core edge. Likewise, the term "ramp down" means a monotonically decreasing concentration from the centerline and moving radially outward to the core edge. The ramp up and ramp down of dopant concentrations are illustrated schematically by an up arrow and a down arrow, respectively, in the plots of FIG. 6 and FIG. 8.

A transmission wavelength is a wavelength that is used for transmission of optical signals in an optical fiber and is not necessarily the peak wavelength but falls within a range of transmission wavelengths having a sufficiently high bandwidth for a given application (i.e., fall within the wavelength band).

The "relative refractive index" as used herein is defined as:

$$\Delta\% = 100 \frac{n^2(r) - n_{cl}^2}{2n^2(r)}$$

where n(r) is the refractive index of the fiber at the radial distance r from the fiber's centerline (r=0) at a wavelength of 1550 nm, unless otherwise specified, and $n_{cl}$ is the index of the outer cladding at a wavelength of 1550 nm. When the outer cladding is essentially pure silica, $n_{cl}$=1.444 at a wavelength of 1550 nm. As used herein, the relative refractive index percent (also referred herein as the relative refractive index) is represented by Δ(or "delta"), Δ% (or "delta %"), or %, all of which can be used interchangeably, and its values are given in units of percent or %, unless otherwise specified. Relative refractive index may also be expressed as Δ(r) or Δ(r) %.

The parameter a (also called the "profile parameter" or "alpha parameter") as used herein relates to the relative refractive Δ(%) where r is the radius (radial coordinate), and which is defined by:

$$\Delta(r)=\Delta_0\{1-[(r-r_m)/(r_0-r_m)]^\alpha\}$$

where $r_m$ is the point where Δ(r) is the maximum $\Delta_0$, $r_0$ is the point at which Δ(r)=0 and r is in the range $r_i$ to $r_f$, where Δ(r) is defined above, $r_i$ is the initial point of the α-profile, $r_f$ is the final point of the α-profile and a is an exponent that is a real number. For a step index profile, α>10, and for a gradient-index profile, α<5.

The maximum relative refractive index $\Delta_0$ is also called the "core delta," and these terms are used interchangeably herein. For a practical fiber, even when the target profile is an alpha profile, some level of deviation from the ideal profile can occur. Therefore, the alpha value for a practical fiber is the best-fit alpha from the measured index profile.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ. The dopants used to form the core of the optical fiber disclosed herein include $GeO_2$ (germania) and $Al_2O_3$ (alumina).

Examples of the co-doped wideband multimode optical fiber disclosed herein meet the Telecommunications Industry Association (TIA) Standard TIA-492AAAE, entitled "Detail Specification for 50-μm Core Diameter/125-μm Cladding Diameter Class 1a Graded-Index Multimode Optical Fibers with Laser-Optimized Bandwidth Characteristics Specified for Wavelength Division Multiplexing," (2016)), and in particular the fibers have an effective modal bandwidth (EMB) of at least 4700 MHz·km at 850 nm and 2470 MHz·km at 953 nm.

In the discussion below, the core of the co-doped wideband multimode optical fiber disclosed herein may be referred to as the "fiber core" and the cladding and its inner, intermediate and outer regions may be referred to as the fiber cladding, fiber inner cladding region, fiber intermediate cladding region and fiber outer cladding region to distinguish from corresponding regions or sections of a preform used to form the co-doped wideband multimode optical fiber.

General Co-Doped Fiber Configuration

Figure 2A:
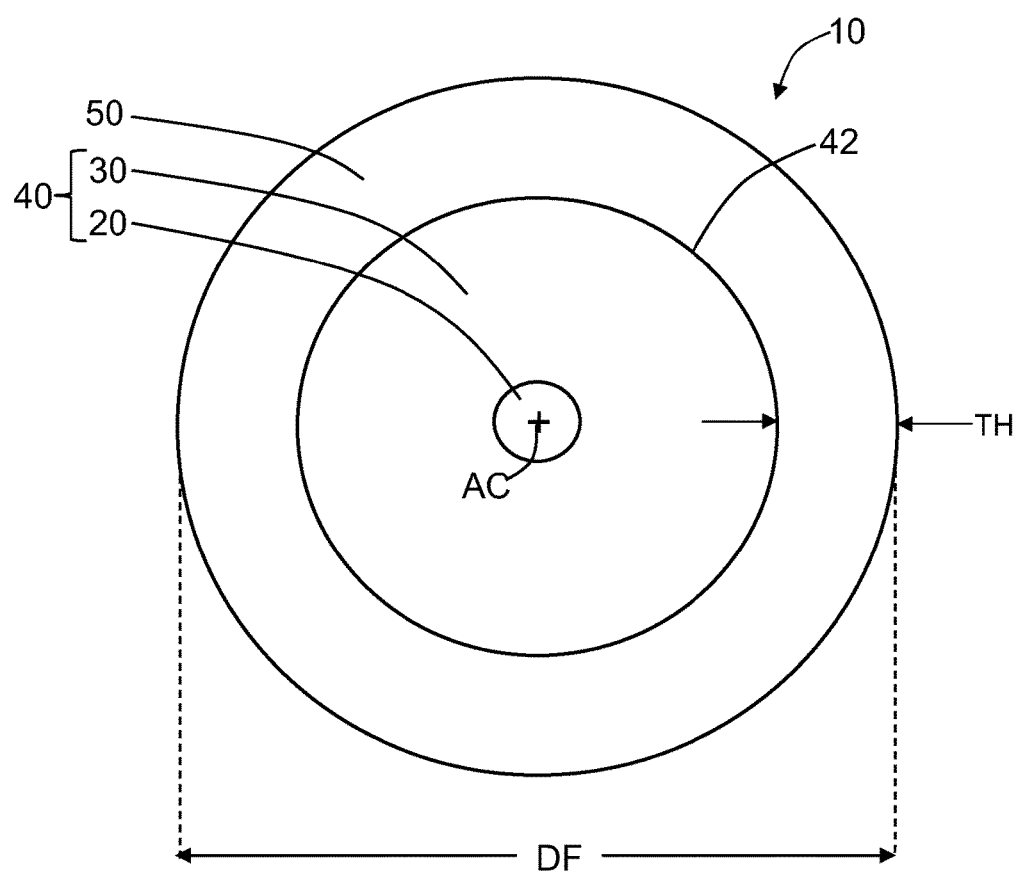
FIG. 2A is a cross-sectional view of the example co-doped wideband multimode optical fiber of FIG. 1.

FIG. 1 is a front-end isometric view of an example co-doped wideband multimode optical fiber ("co-doped fiber") 10 as disclosed herein while FIG. 2A is a cross-sectional view of the co-doped fiber 10 of FIG. 1. The co-doped fiber 10 has a centerline AC, a core section ("core") 20 and a cladding section ("cladding") 30 that immediately surrounds the core. The core 20 and the cladding 30 are made of glass and define a glass section 40 that has an outer surface 42. The co-doped fiber 10 also includes a non-glass protective coating 50 that immediately surrounds the outer surface 42 of the glass section 40 and which in an example comprises a polymer such as acrylate. In an example, the non-glass protective coating 50 can comprise two or more layers of different polymeric materials. The non-glass protective coating 50 has a thickness TH and along with the glass section 40 defines a fiber diameter DF of the co-doped fiber 10. In an example of an 50/125/250 co-doped fiber 10, the fiber core 20 has a diameter of 50 microns, the glass section 40 has a diameter of 125 microns and the fiber diameter DF is 250 microns, while the thickness TH of the non-glass protective coating is 62.5 microns.

Figure 2B:
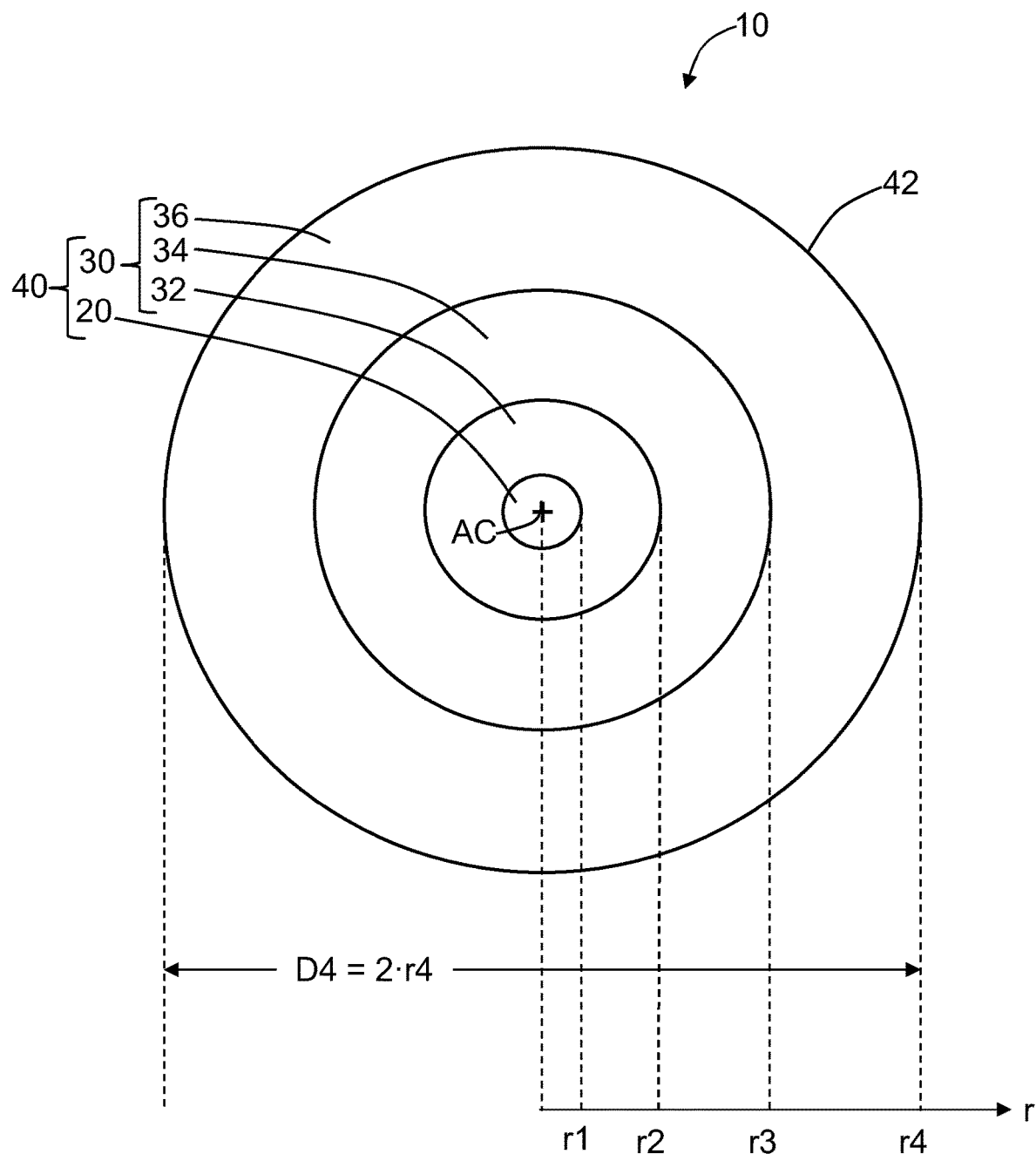
FIG. 2B is a close-up cross-sectional view of the glass section of the co-doped wideband multimode optical fiber showing the cladding section constituted by an inner cladding region, an intermediate cladding region and an outer cladding region.

FIG. 2B is a cross-sectional view of the glass section 40 of the co-doped fiber 10 (i.e., the co-doped fiber 10 without the non-glass protective coating 50). The radial coordinate is r. FIG. 2B shows that the core 20 has a radius r1, and that the cladding 30 comprises an inner cladding region 32 of outer radius r2, an intermediate cladding region 34 of outer radius r3, and an outer cladding region 36 of outer radius r4, which is also the radius of the cladding 30 and of the glass section 40. The diameter of the cladding 30 and the glass section 40 is D4=2·r4. The core 20 has its outer "edge" at the radius r1.

Figure 3:
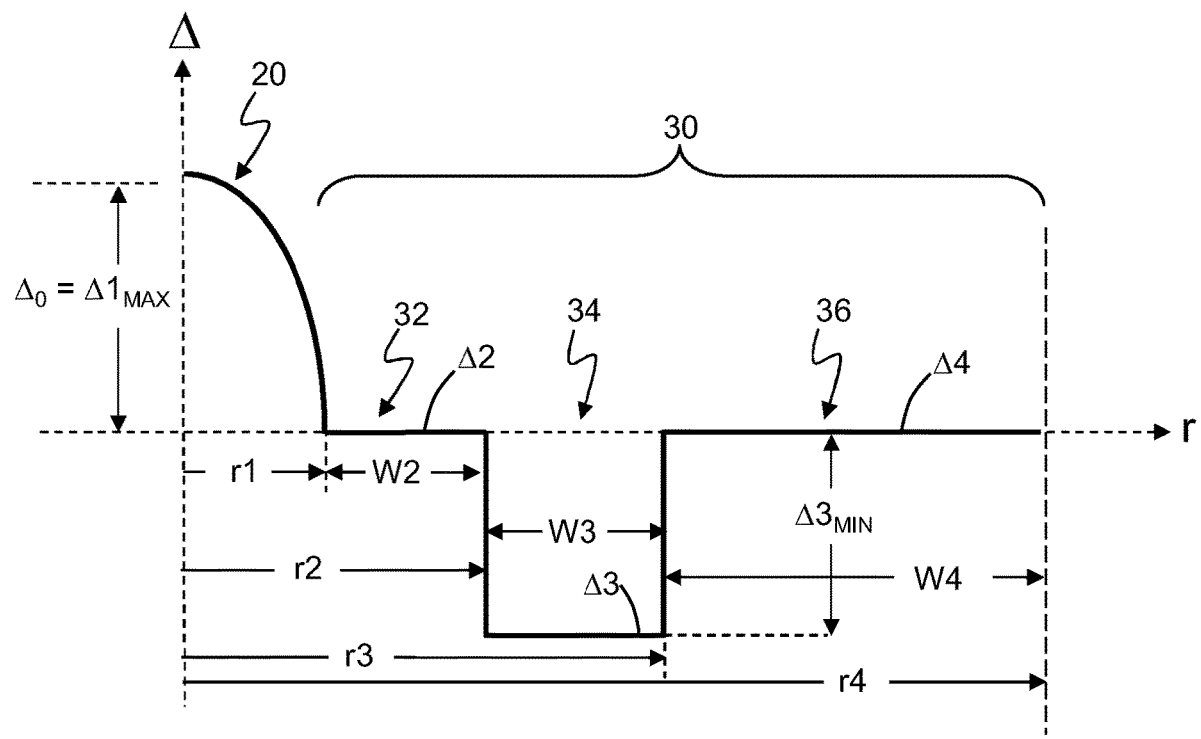
FIG. 3 is an example relative refractive index profile of the co-doped wideband multimode optical fiber as disclosed herein as a plot of the relative refractive index Δ versus the radial coordinate r.

FIG. 3 plots an idealized relative refractive index profile of the co-doped fiber 10 as the relative refractive index Δ versus the radial coordinate r. The core 20 has relative refractive index Δ1(r), with a maximum refractive index of $\Delta_0=\Delta 1_{MAX}$ at r=0 and gradient α-profile, which is described in greater detail below. The inner cladding region 32 has a relative refractive index Δ2 and a width W2. The intermediate cladding region 34 can be in the form of a moat or trench and has a width W3 and a relative refractive index Δ3<Δ2, with a minimum value $\Delta 3_{MIN}$. The outer cladding region 36 has a width W4 and relative refractive index Δ4, which is shown by way of example as Δ2=Δ4. Other configurations for the relative refractive index profile are discussed below.

Co-Doped Fiber Core

Figure 4:
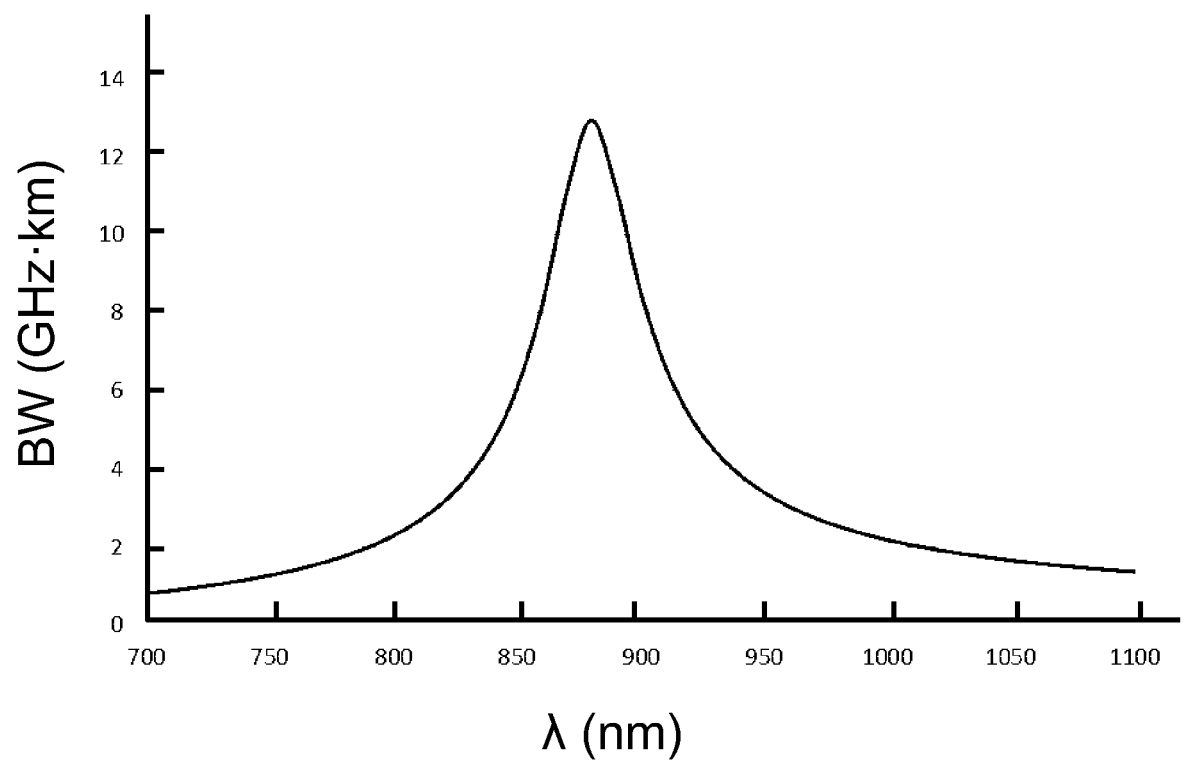
FIG. 4 is a plot of the bandwidth BW (GHz·km) versus wavelength λ (nm) for an idealized multimode fiber having a core doped with a single dopant $GeO_2$ to have a maximum core Δ1 of $\Delta 1_{MAX}$=1% optimized for wideband applications.

FIG. 4 is a plot of the bandwidth BW (GHz·km) versus wavelength λ (nm) for an idealized multimode fiber having a core doped with a single dopant $GeO_2$ to have a maximum core Δ1 of $\Delta 1_{MAX}$=1% optimized for wideband applications. The peak wavelength $\lambda_P$=880 nm and is selected to provide sufficiently high bandwidths at transmission wavelengths of 850 nm and 950 nm, i.e., so that these transmission wavelengths reside within the wavelength band Δλ. The bandwidths BW at the transmission wavelengths λ of 850 nm and 950 nm are about 6 GHz·km and 3.4 GHz·km, respectively, which in principle can meet the TIA Standard wideband bandwidth requirements noted above.

Unfortunately, the bandwidth curve of FIG. 4 is for a single-dopant multimode fiber having ideal (perfect) α-profile (and corresponds to example CE1 in Table 2, below). In reality, various fabrication defects degrade the bandwidth versus transmission wavelength performance of the single-dopant multimode fiber from the theoretical values of the ideal α-profile. The degradation is such that the fabricated version of the multimode fiber will generally not meet the wideband bandwidth requirements for desired transmission wavelengths used to perform SWDM. Said differently, the single-dopant multimode fiber with the bandwidth curve of FIG. 4 is not a commercially viable option for SWDM applications and like applications that require a relatively wide wavelength band Δλ.

The co-doped fiber 10 disclosed herein forms the core 20 using two core dopants, namely $GeO_2$ and $Al_2O_3$, i.e., the core is made of silica and is co-doped. As discussed in greater detail below, the co-doped fiber 10 can be made using a co-doped preform fabricated using either an outside vapor deposition (OVD) process, a modified chemical vapor deposition (MCVD) process, or a plasma chemical vapor deposition (PCVD) using $GeO_2$ and $Al_2O_3$ dopants and then drawing the preform to form the co-doped fiber.

For the co-doped fiber 10 formed using the two dopants $GeO_2$ (dopant 1) and $Al_2O_3$ (dopant 2), the refractive index profile can be described by the following equation $$n_1^2(r) = n_0^2(1 - 2\Delta_1 r^{\alpha_1} - 2\Delta_2 r^{\alpha_2})$$

where $\Delta_1$ and $\Delta_2$ are the relative refractive index changes for two profiles corresponding to $\alpha_1$ and $\alpha_2$, respectively, and r is the radial coordinate. The parameters $\alpha_1$ and $\alpha_2$ are parameters used to describe the refractive index profile and each can depend on the concentration of the $GeO_2$ dopant and the $Al_2O_3$ dopant.

For an optimized profile, $\alpha_1$ and $\alpha_2$ satisfy the following conditions:

$$\alpha_i = 2 - 2\frac{n_0}{m_0}\frac{\lambda}{\Delta_i}\frac{d\Delta_i}{d\lambda} - \frac{12}{5}\Delta$$

for i=1, 2 and where $$\Delta = \Delta_1 + \Delta_2$$

and where each of $\Delta_1$ and $\Delta_2$ can have contributions from both dopants.

Two adjustable parameters $x_1$ and $x_2$ are introduced to describe the relative index changes such that $$\Delta_1 = \frac{(\delta_{11} - \delta_{12})(1 - x_1) + (\delta_{21} - \delta_{22})x_2}{2n_0^2}$$

$$\Delta_2 = \frac{(\delta_{11} - \delta_{12})x_1 + (\delta_{21} - \delta_{22})(1 - x_2)}{2n_0^2}$$

where $$\delta_{11} = n_{11}^2 - n_s^2$$

$$\delta_{12} = n_{12}^2 - n_s^2$$

$$\delta_{21} = n_{21}^2 - n_s^2$$

$$\delta_{22} = n_{22}^2 - n_s^2$$

and where $n_{11}$ and $n_{21}$ are the refractive indices in the center of the core 20 (r=0) corresponding to dopants 1 and 2, respectively, $n_{12}$ and $n_{22}$ are the refractive indices at the edge of fiber core (r=r1) corresponding to dopants 1 and 2, respectively, while $n_s$ is the refractive index of pure silica, and $$n_0^2 = n_{11}^2 + n_{21}^2 - n_s^2.$$

Using the definitions above, the dopant concentration profiles in the co-doped core 20 can be expressed as $$C_1(r) = C_{11} - (C_{11} - C_{12})(1 - x_1)r^{\alpha_1} - (C_{11} - C_{12})x_1 r^{\alpha_2}$$

$$C_2(r) = C_{21} - (C_{21} - C_{22})x_2 r^{\alpha_1} - (C_{21} - C_{22})(1 - x_2)r^{\alpha_2}$$

where $C_{11}$ and $C_{21}$ are the dopant concentrations in the center of the core 20 (r=0) corresponding to dopants 1 and 2, respectively, while $C_{12}$ and $C_{22}$ are the dopant concentrations at the edge of core 20 (r=r1) corresponding to dopants 1 and 2, respectively. Note that the above equations $C_1$ and $C_2$ depend on $x_1$ and $x_2$, which also relate to the relative refractive index in the equations above. Wavelength values can be taken as the same as for the definition of $\delta_{11}$, $\delta_{12}$, $\delta_{21}$ and $\delta_{22}$ for the corresponding refractive index values of $n_{11}$, $n_{21}$, $n_{12}$ and $n_{22}$ (e.g., 1550 nm).

Figure 5:
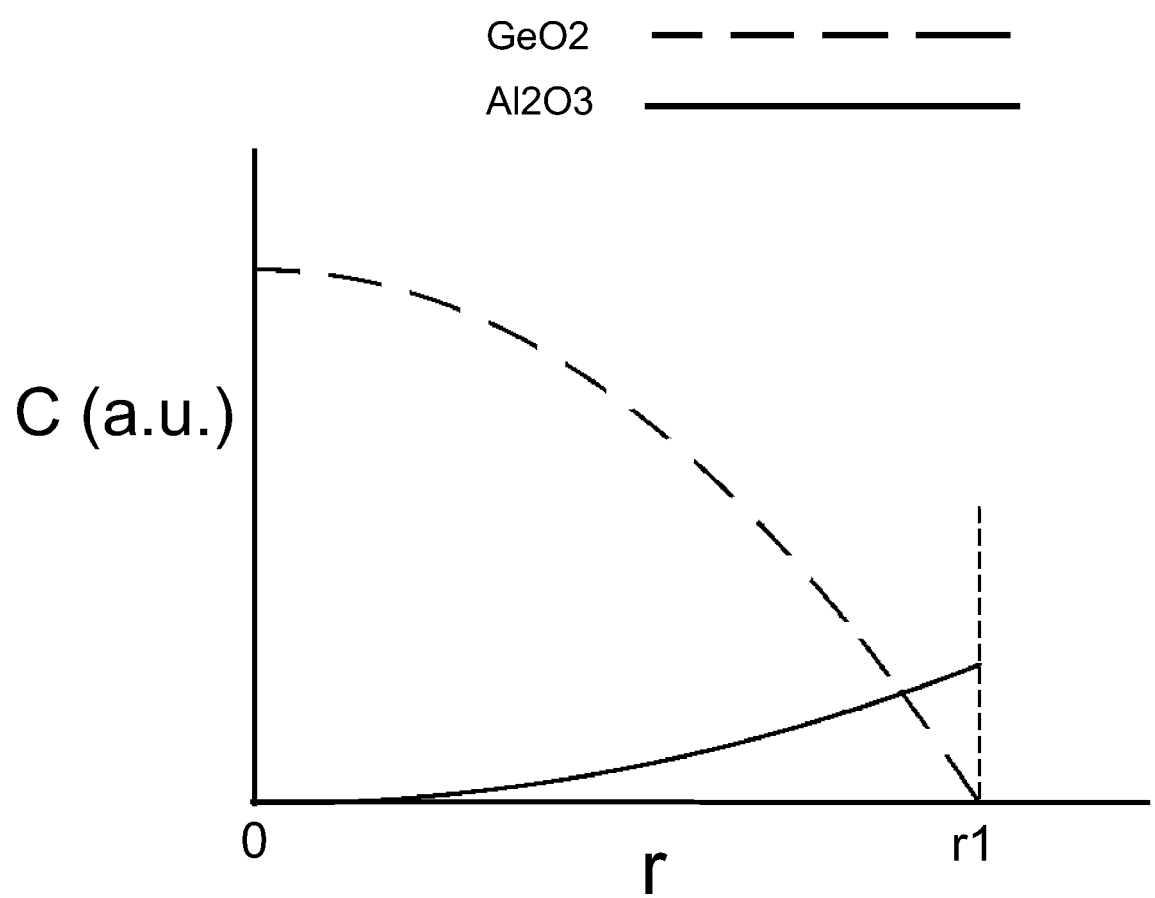
FIG. 5 is a schematic plot of the doping concentration C (arbitrary units, a.u.) versus the fiber radius r that illustrates $GeO_2$ and $Al_2O_3$ core doping profiles used for the co-doped wideband multimode optical fiber disclosed herein.

FIG. 5 is a schematic plot of the doping concentration C (arbitrary units, a.u.) versus the fiber radius r that illustrates example $GeO_2$ and $Al_2O_3$ core doping profiles (concentrations) used for the co-doped core 20 of the co-doped fiber 10 disclosed herein. Both the $GeO_2$ and $Al_2O_3$ concentrations follow alpha profiles, with the $GeO_2$ concentration decreasing with radius (ramping down) and $Al_2O_3$ concentration increasing (ramping up) with radius, where the core edge is at r=r1. By defining the dopant concentrations and alpha values for $GeO_2$ and $Al_2O_3$ as set forth above, the bandwidth window (i.e., wavelength band $\Delta\lambda$ for a given bandwidth BW) can be substantially enlarged, e.g., to the point where the co-doped fiber 10 is suitable for SWDM applications, i.e., is a commercially viable fiber for SWDM and like applications.

Figure 6:
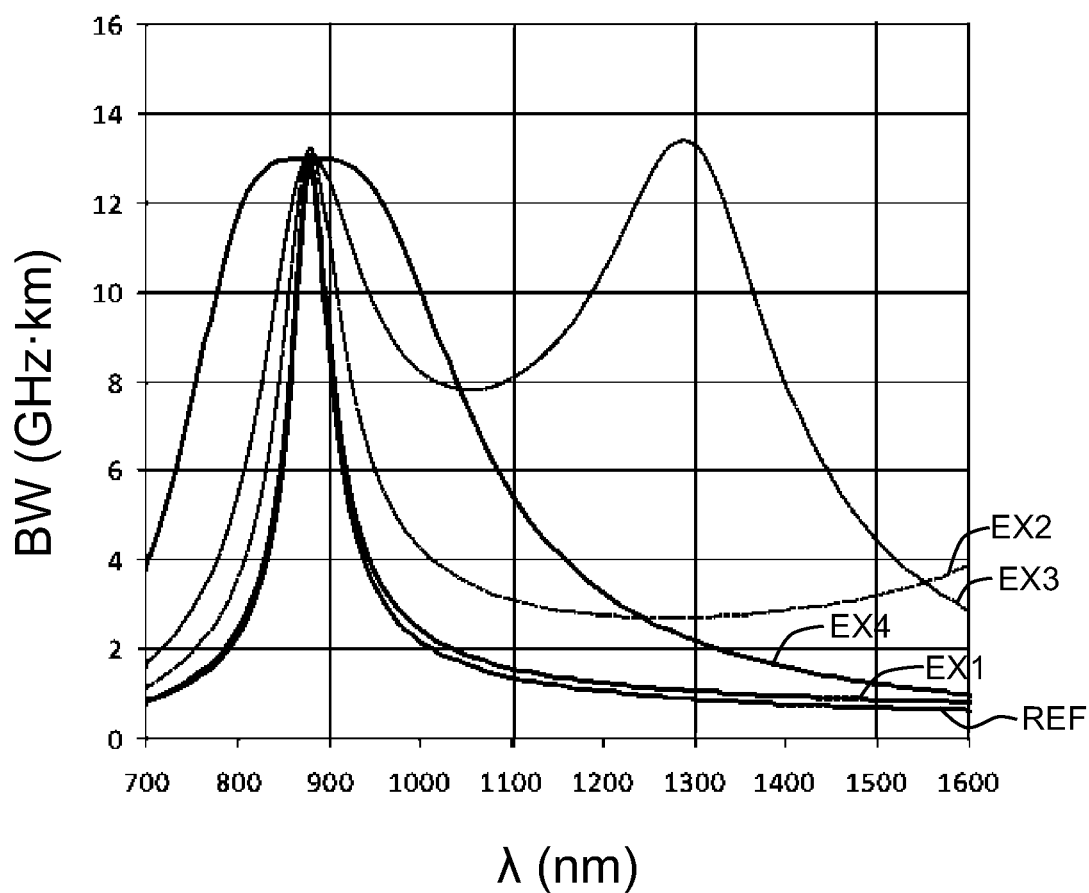
FIG. 6 is a plot of the calculated bandwidth BW (GHz·km) versus wavelength λ (nm) for example co-doped wideband multimode optical fibers having different $GeO_2$ and $Al_2O_3$ doping profiles, along with a comparative reference example that includes only a single $GeO_2$ dopant.
Figure 7:
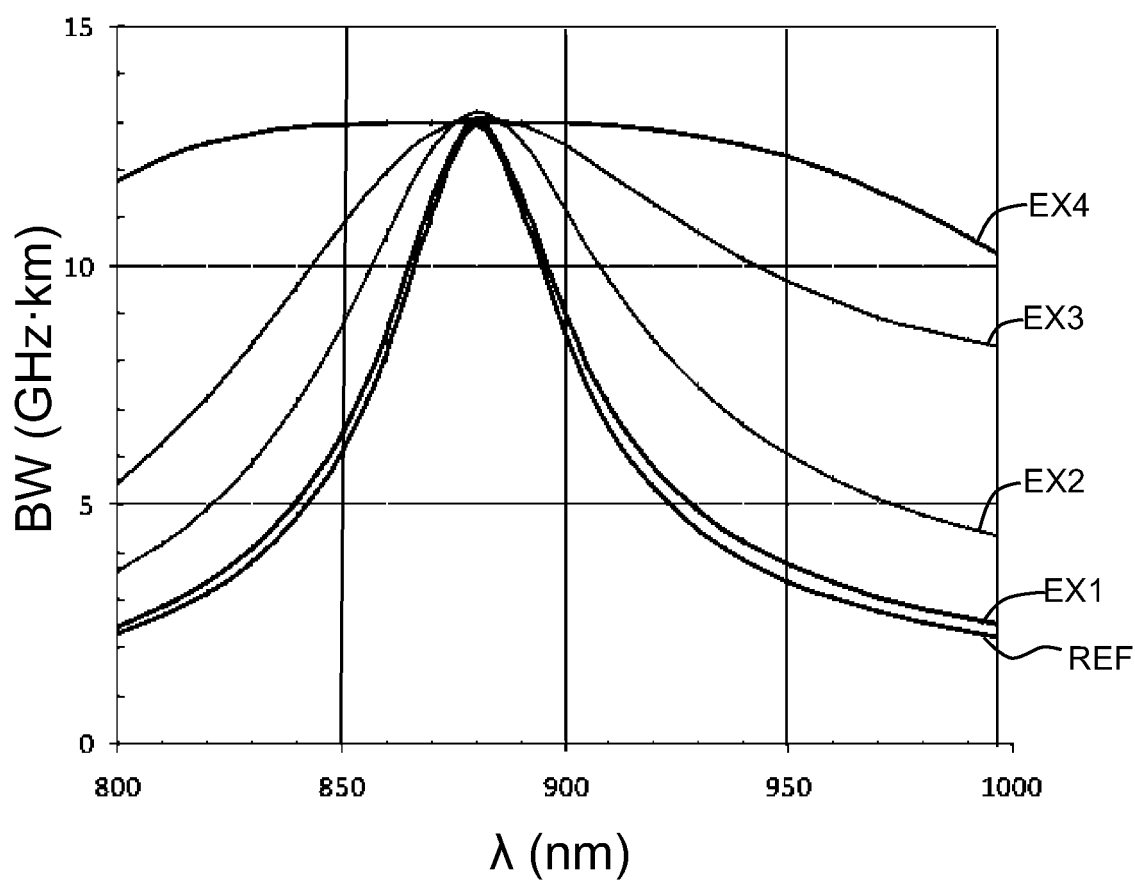
FIG. 7 is a close-up view of the wavelength range from 800 nm to 1000 nm of the plot of FIG. 6.

FIG. 6 is a plot of the calculated bandwidth BW (GHz·km) versus wavelength $\lambda$ (nm) for example co-doped fibers 10 having different $GeO_2$ and $Al_2O_3$ doping profiles according to Table 1 below, which is also presented in the legend in FIG. 6. The curve "REF" is the curve of FIG. 5, which is the multimode fiber that includes only the $GeO_2$ dopant and is for reference (and is example CE2 in Table 2, further below). The up arrows in the legend indicate a ramped up concentration while a down arrow indicates a ramped down concentration. FIG. 7 is a close-up view of the portion of FIG. 6 for the wavelength range from 800 nm to 1000 nm.

TABLE 1

| Curve | $GeO_2$ (wt %) (r = 0) | $Al_2O_3$ (wt %) (r = r1) | $\alpha_{GeO2}$ | $\alpha_{Al2O3}$ |
|---|---|---|---|---|
| REF | 15.5 | 0 | 2.057 | 2.057 |
| EX1 | 16.4 | 1 | 2.060 | 2.060 |
| EX2 | 18.4 | 3 | 2.046 | 2.046 |
| EX3 | 19.6 | 4 | 2.029 | 2.029 |
| EX4 | 20.8 | 5 | 2.005 | 2.005 |

In generating the results for FIG. 5 (i.e., the REF curve in FIG. 6), the core relative refractive index $\Delta 1$ was kept constant at $\Delta 1 = 1\%$. The $GeO_2$ concentration at the edge of fiber core (r=r1) was 0 wt %, and $Al_2O_3$ concentration in the center of core was 0 wt %. The $x_1$ and $x_2$ values were both 0.5 for the examples of FIG. 5 and FIG. 6.

The enlargement of the wavelength band $\Delta\lambda$ seen in curves 1 thorough 4 in FIG. 6 is due to the $Al_2O_3$ doping in the core 20 in a manner that increases from the centerline AC radially outward to the core edge at r=r1 where the $Al_2O_3$ concentration is maximum. When the maximum $Al_2O_3$ concentration increases, the bandwidth window $\Delta\lambda$ around 850 nm becomes wider. When the maximum $Al_2O_3$ doping concentration becomes sufficiently high, a second bandwidth window appears, as seen in the curve 3 of FIG. 6. This allows for the co-doped fiber 10 to operate in two optimum bandwidth (wavelength) windows centered at 850 nm and 1310 nm, as shown in FIG. 6. When the first and second bandwidth windows sit side by side, the two windows become one large window, as illustrated by curve 4. Therefore, $GeO_2$ and $Al_2O_3$ co-doping of the core 20 with a $Al_2O_3$ gradient that increases with radius r outward from the centerline enables a co-doped fiber 10 with a very larger operating window (large wavelength band $\Delta\lambda$) as compared to a single-dopant wideband multimode fiber.

With reference again to the idealized relative refractive index profile of FIG. 3, the core 20 is co-doped with $GeO_2$ and $Al_2O_3$ as described above. In an example, the maximum core relative refractive index $\Delta 1_{MAX}$ is between 0.5 to 2%, and the core diameter 2·r1 is between 20 to 70 microns, i.e., the core radius r1 is between 10 and 35 microns. In an example, the core alpha value is between 1.9 to 2.3 and depends on the values of $\alpha_{GeO2}$ and $\alpha_{Al2O3}$ and is not just the sum of the two alpha values.

The bend performance of the proposed $GeO_2$ and $Al_2O_3$ co-doped MMF can be improved by the intermediate cladding region 34 being in the form of a trench or moat as shown. The bend performance of the co-doped fiber 10 has been observed to scale with the moat volume V, which is defined for a moat with $\Delta 3$ as a constant $\Delta 3_{MIN}$:

$$V = \Delta 3_{MIN} \cdot [(r3)^2 - (r2)^2].$$

In an example where the relative refractive index $\Delta 3$ varies with radial coordinate (i.e., $\Delta 3(r)$), then the moat volume is given by $$V = 2\int \Delta 3(r) r \, dr$$

with the limits on the integration being from r2 to r3.

Preferably, the minimum relative refractive index $\Delta 3_{MIN}$ of the intermediate cladding region (moat) 34 is between −0.1 to −0.7%, and the moat width W3=r3−r2 is between 2 and 10 microns, and the moat volume V is between 60 to 180 $\mu m^2$-%. The preferred moat volume V can be achieved in one embodiment by having the moat 34 made using pure silica and by having updoped inner and outer cladding layers 32 and 36.

In an example, the relative refractive index $\Delta 2$ of the inner cladding region 32 is that of undoped silica and is preferably matched to the relative refractive index $\Delta 1$ at the edge of core, i.e., $\Delta 1(r1) = \Delta 2(r1)$. The relative refractive index $\Delta 4$ of the outer cladding region 36 can be the same or slightly higher than the relative refractive index $\Delta 2$ of the inner cladding region.

In an example, the updoped inner and outer cladding regions 32 and 36 can be made by doping the silica glass with an updopant, such as $GeO_2$, $Al_2O_3$, $TiO_2$, Cl, etc. In a separate embodiment, the moat of the intermediate cladding region 34 can also be constructed using fluorine downdoping. In this embodiment, the $Al_2O_3$ dopant concentration drops continuously to zero from the maximum doping level following the overall core alpha profile. The inner and outer cladding regions 32 and 36 can be pure silica in this case.

Example Co-Doped Fibers

Modeled examples EX1 through EX7 of $GeO_2$ and $Al_2O_3$ co-doped fibers 10 are set forth in Table 2 below. All the examples in Table 2 have a core delta of about 1% relative to the last point of the alpha profile. The cladding 30 can be a uniform cladding with the delta the same as the last point of the alpha profile. The cladding 30 can include a low index trench 34 to improve the bending performance as described above. The core radius r1 is about 25 μm. Other core radii can be used without affecting the bandwidth window significantly as the bandwidth is determined by the core delta. The wavelength units are in nanometers. The parameters $\lambda_L$ and $\lambda_U$ stand for the upper and lower wavelengths around the peak wavelength $\lambda_P$ that have a bandwidth BW of 5 GHz·km, while the $\Delta\lambda$ is wavelength band (in nanometers) over which the bandwidth BW is 5 GHz·km or greater, and is defined by the wavelength range between $\lambda_L$ and $\lambda_U$. The example fibers 10 EX1 through EX7 have the $Al_2O_3$ ramping up in concentration from the fiber centerline AC outwards while the $GeO_2$ concentration ramps downward, as illustrated in FIG. 5. The alpha parameters $\alpha_1$ and $\alpha_2$ are for the concentration equations as set forth above, while the alpha parameters $\alpha_{GeO2}$ and $\alpha_{Al2O3}$ are the α values of the relative index $\Delta$ profiles due to $GeO_2$ and $Al_2O_3$ doping, respectively. The examples CE1 and CE2 in Table 2 are comparative examples, and the example CE1 is also shown in FIG. 6. The example CE1 is doped with ramped down $GeO_2$ only without $Al_2O_3$. In example CE2, the $Al_2O_3$ concentration is high at the center of the core and ramps down from the fiber centerline outwards until it is zero at the core edge (r=r1), i.e., opposite to what is shown in FIG. 5.

TABLE 2

| EX | Profile | $\alpha_1$ | $\alpha_2$ | $\alpha_{GeO2}$ | $\alpha_{Al2O3}$ | $\lambda_P$ | $\lambda_L$ | $\lambda_U$ | $\Delta\lambda$ |
|---|---|---|---|---|---|---|---|---|---|
| EX1 | $GeO_2$ = 16.4 wt %, $Al_2O_3$ = 1 wt %, (x1 = 0.5, x2 = 0.5) | 2.06 | 2.06 | 2.15 | 2.05 | 880 | 839 | 927 | 88 |
| EX2 | $GeO_2$ = 18.5 wt %, $Al_2O_3$ = 3 wt %, (x1 = 0.5, x2 = 0.5) | 2.05 | 2.05 | 2.15 | 2.05 | 880 | 822 | 974 | 152 |
| EX3 | $GeO_2$ = 19.6 wt %, $Al_2O_3$ = 4 wt %, (x1 = 0.5, x2 = 0.5) | 2.03 | 2.03 | 2.15 | 2.02 | 880 | 794 | >1200 | >400 |
| EX4 | $GeO_2$ = 20.8 wt %, $Al_2O_3$ = 5 wt %, (x1 = 0.5, x2 = 0.5) | 2.01 | 2.01 | 2.11 | 2.01 | 880 | 720 | 1116 | 396 |
| EX5 | $GeO_2$ = 18.5 wt %, $Al_2O_3$ = 3 wt %, (x1 = 1, x2 = 2) | 2.17 | 2.09 | 2.17 | 2.25 | 850 | 784 | 948 | 164 |
| EX6 | $GeO_2$ = 18.5 wt %, $Al_2O_3$ = 3 wt %, (x1 = 0.5, x2 = 1.23) | 2.10 | 1.67 | 1.95 | 1.3 | 850 | 792 | 943 | 151 |
| EX7 | $GeO_2$ = 18.5 wt %, $Al_2O_3$ = 3 wt %, (x1 = 0.33, x2 = 1.25) | 2.10 | 2.57 | 2.33 | 3.4 | 850 | 798 | 930 | 132 |
| CE1 | $GeO_2$ = 15.5 wt %, $Al_2O_3$ = 0 wt % | 2.06 | 2.06 | 2.15 | na | 880 | 843 | 923 | 80 |
| CE2 | $GeO_2$ = 12.1 wt %, $Al_2O_3$ = 3 wt % | 2.07 | 2.07 | 2.14 | na | 850 | 812 | 892 | 60 |

Figure 8:
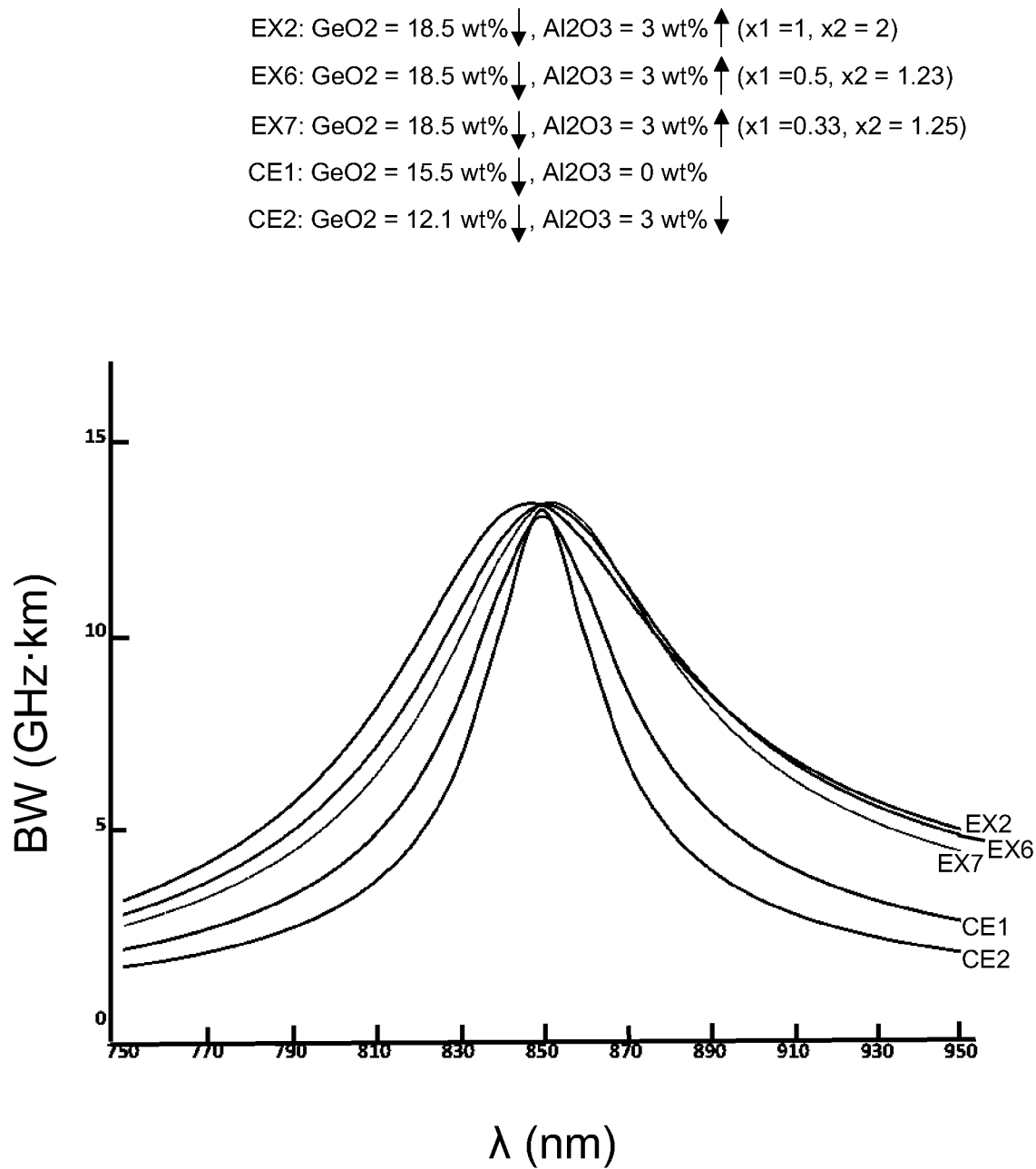
FIG. 8 is a plot of the calculated bandwidth BW (GHz·km) versus wavelength λ (nm) for example co-doped wideband multimode optical fibers having different $GeO_2$ and $Al_2O_3$ doping profiles as taken from Table 2, below.

The plots of FIGS. 6, 7 and 8 show that the wavelength band $\Delta\lambda$ of the bandwidth BW as a function of wavelength $\lambda$ increases when $Al_2O_3$ is used as a second dopant and ramps up in concentration as compared to having just $GeO_2$ as a single dopant for the core. For example, the plots show that for a bandwidth BW>5 GHz-km for just $GeO_2$ (Example CE1), the wavelength band $\Delta\lambda$ about 80 nm. In contrast, the wavelength band $\Delta\lambda$ for a co-doped fiber 10 with core dopants of $GeO_2$ and $Al_2O_3$ (ramping $Al_2O_3$ up with core radius) can be in various embodiments: $\Delta\lambda \geq 100$ nm, $\Delta\lambda \geq 130$ nm, $\Delta\lambda \geq 150$ nm, $\Delta\lambda \geq 200$ nm or even $\geq 300$ nm.

In some embodiments, the peak wavelength $\lambda_P$ is in the range from about 800 nm to 1200 nm. In some embodiments, the peak wavelength $\lambda_P$ is in the range from about 800 to 1000 nm. In some embodiments, peak wavelength $\lambda_P$ is in the range from about 800 to 900 nm. In some embodiments, the peak wavelength $\lambda_P$ is in the range from about 820 to 900 nm. In some embodiments, the peak wavelength $\lambda_P$ is in the range from about 840 to 890 nm.

The comparative examples CE1 and CE2 wherein the $Al_2O_3$ ramps down in concentration from the centerline outwards show that the wavelength band $\Delta\lambda$ of the high BW decreases (e.g., BW$\geq$5 GHz-km drops to 57 nm or lower).

FIG. 8 is a plot of the calculated bandwidth BW (GHz·km) versus wavelength $\lambda$ (nm) for the comparative examples CE1 and CE2 as well as examples EX2, EX6 and EX7 of the co-doped fibers 10 of Table 2, with an up arrow in the legend for the examples EX2, EX6 and EX7 indicating a ramped up concentration and a down arrow for the comparative examples CE1 and CE2 indicating a ramped down concentration. The different curves for examples EX2, EX6, and EX7 in the plot of FIG. 8 illustrate the increase in wavelength band $\Delta\lambda$ with increased and ramped up $Al_2O_3$ concentration for a given $GeO_2$ concentration of 18.5 wt %. Note again how the comparative example CE2 with the $Al_2O_3$ ramp down in concentration (i.e., opposite of the ramp up concentration in the co-doped fibers 10) results in a decrease in the wavelength band $\Delta\lambda$ as compared to the single-dopant comparative example CE1 as well as to the co-doped fibers 10 with the ramped up $Al_2O_3$ concentration.

Summary of Example Fiber Parameters

In an example, the co-doped core 20 is doped with $GeO_2$ having maximum concentration in the range from 5 wt % to 25 wt % and is doped with $Al_2O_3$ having a maximum concentration in the range from 1 wt % to 12 wt % or 1 wt % to 10 wt % or 2 wt % to 10 wt % or 2 wt % to 8 wt % or 3 wt % to 6 wt %.

In another example, the co-doped core 20 is doped with $GeO_2$ having maximum concentration in the range from 8 wt % to 20 wt % and is doped with $Al_2O_3$ having a maximum concentration in the range from 3 wt % to 8 wt %.

In another example, the co-doped core 20 is doped with $GeO_2$ having maximum concentration in the range from 8 wt % to 20 wt % and is doped with $Al_2O_3$ having a maximum concentration in the range from 3 wt % to 10 wt %.

In another example, the co-doped core 20 is doped with $GeO_2$ having maximum concentration in the range from 10 wt % to 12 wt % and is doped with $Al_2O_3$ having a maximum concentration in the range from 1 wt % to 3 wt %, and a peak wavelength $\lambda_P$ in the range from 800 nm to 1100 nm and wherein the wavelength band is in the range from 100 nm to 150 nm.

In another example, the $GeO_2$ concentration is a first concentration defined by a first alpha value $\alpha_1$ and the $Al_2O_3$ concentration is a second concentration defined by a second alpha value $\alpha_2$, wherein $2.0 \leq \alpha_1 \leq 2.2$ and $2.0 \leq \alpha_2 \leq 2.6$.

In an example, the co-doped core 10 has a maximum relative refractive index $\Delta 1_{MAX}$ in the range from $0.5\% \leq \Delta 1_{MAX} \leq 2\%$ and an intermediate cladding region 34 that comprises a mote and that has a minimum relative refractive index $\Delta 3_{MIN}$, wherein $-0.7\% \leq \Delta 3_{MIN} \leq -0.1\%$ and a moat width of between 2 microns and 10 microns. Also in an example, the moat has a moat volume V in the range 60 $\mu m^2 \leq V \leq 180$ $\mu m^2$-%.

In an example, the co-doped fiber 10 has a bandwidth BW$\geq$5 GHz·km with a peak wavelength $\lambda_P$ that is within a wavelength range of 800 nm to 1200 nm and over a wavelength band $\Delta\lambda$ of at least 100 nm.

In various examples, the co-doped fiber 10 has a wavelength band $\Delta\lambda$ of at least 130 nm, or at least 135 nm, or at least 200 nm or at least 300 nm, or between 100 nm and 300 nm. In another example, the wavelength band $\Delta\lambda$ is defined by the wavelength interval between the following lower and upper wavelengths $\lambda_L$ and $\lambda_U$: between $\lambda_L$=850 nm and $\lambda_U$=980 nm or the wavelength interval between $\lambda_L$=850 nm and $\lambda_U$=985 nm, or the wavelength interval between $\lambda_L$=850 nm and $\lambda_U$=1050 nm or the wavelength interval between 4=850 nm and $\lambda_U$=1150 nm.

In various examples, the peak wavelength $\lambda_P$ is within a wavelength range of 800 nm to 1000 nm or 800 nm to 900 nm, or 840 nm to 890 nm.

In various examples, the co-doped core 20 has a diameter of between 20 microns and 70 microns, and the cladding 30 has a diameter of 125 microns.

Fabricating the Co-Doped Fiber

Figure 9:
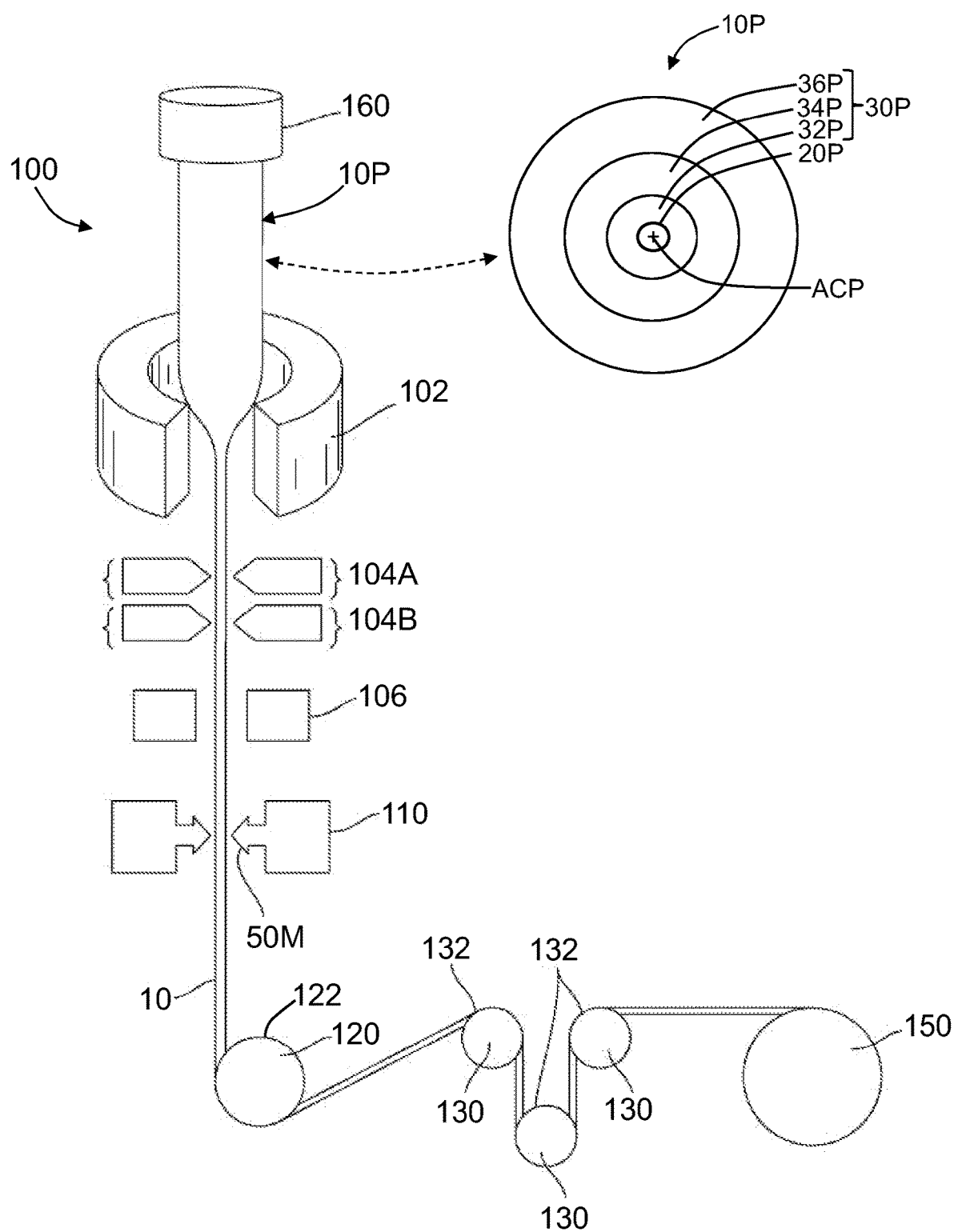
FIG. 9 is a schematic diagram of an example optical fiber drawing system used to fabricate co-doped wideband multimode optical fiber disclosed herein.

The co-doped fiber 10 can be fabricated using standard optical fiber fabrication drawing techniques using a suitably fabricated glass co-doped preform. FIG. 9 is a schematic diagram of an example optical fiber drawing system ("drawing system") 100 used to fabricate the co-doped fiber 10 disclosed herein using a co-doped preform 10P. The drawing system 100 may comprise a draw furnace 102 for heating an end of the co-doped preform 10P to its glass melt temperature (e.g., to about 2000° C.), non-contact measurement sensors 104A and 104B for measuring (the size of the drawn co-doped fiber 10 as it exits the draw furnace for size (diameter) control, a cooling station 106 to cool the drawn co-doped fiber, a coating station 110 that coats the drawn co-doped fiber with a non-glass coating material 50M to form the non-glass protective coating 50, a tensioner 120 to pull (draw) the co-doped fiber, guide wheels 130 to guide the drawn co-doped fiber, and a fiber take-up spool ("spool") 150 to store the drawn co-doped fiber. The tensioner has a surface 122 and the guide wheels have surfaces 132 over which the drawn co-doped fiber passes.

The drawing system 10 also includes a preform holder 160 located adjacent the top side of the draw furnace 102 and that holds the co-doped preform 10P used to form the co-doped fiber 10. The close-up inset of FIG. 9 shows a cross-sectional view of the co-doped preform 10P. The co-doped preform 10P has a preform centerline ACP, core 20P and a cladding 30P. The cladding 30P includes an inner cladding region 32P, an intermediate cladding region 34P, and an outer cladding region 36P.

The glass co-doped preform 10P has generally the same relative configuration as co-doped fiber 10 (e.g., the same profile shape as shown in FIG. 3, same co-doping concentration profiles, etc.) as but is much larger, e.g., 25X to 100X larger. The glass co-doped preform 10P can be made using standard preform fabrication process, such as by the aforementioned OVD, MCVD or PCVD processes using $GeO_2$ and $Al_2O_3$ dopants to dope the preform core 20P in a manner that forms the co-doped fiber core 20 as described above. For example, in an OVD process, the select co-doped relative refractive index profile is formed by introducing the dopants $GeO_2$ and $Al_2O_3$ while the soot particles used to build the preform are deposited on the outside of a rotating vitreous silica rod. The concentrations of the two dopants are changed and as the preform becomes larger in diameter.

The inner and outer preform cladding regions 32P and 36P can be updoped using for example $GeO_2$, $Al_2O_3$, $TiO_2$, Cl, etc. In a separate embodiment, the intermediate preform cladding region 34P can also be constructed by down doping, e.g., using a down dopant such as fluorine. In this embodiment, the $Al_2O_3$ dopant concentration drops continuously to zero from the maximal doping level in the preform core 20P following an overall core alpha profile. The inner and outer preform cladding regions 32P and 36P can be pure silica in this case or can be updoped.

After the co-doped preform 10P is formed, it is operably supported in the preform holder 160 and relative to the draw furnace 102, as shown in FIG. 9. The co-doped preform 10P is then heated at one end by the draw furnace 102 and drawn into the co-doped fiber 10 using the drawing system 100. The drawing process for co-doped fiber 10 is similar to a conventional fiber draw process used for singly doped fibers. The resulting fiber 10 has the aforementioned core 20 and cladding 30, which as noted above can be referred to as the fiber core and the fiber cladding respectively, to distinguish from the corresponding preform sections of the preform 10P.

In the fabrication process, the glass co-doped fiber 10 drawn from co-doped preform 10P exits the draw furnace 102, with tension applied by the tensioner 120. The dimensions (e.g., the diameter) of the co-doped fiber 10 are measured by the non-contact sensors 104A and 104B and the measured dimensions are used to control the draw process. The co-doped fiber 10 can then pass through the cooling mechanism 106, which can be filled with a gas that facilitates cooling at a rate slower than air at ambient temperatures. The coating device 110 then applies the non-glass protective coating material 50M to form the non-glass protective coating 50.

The coated co-doped fiber 10 passes from the tensioner 120 to the guide wheels 130, then through the guide wheels to the spool 150, where the fiber is taken up and stored. The configuration of the glass co-doped preform 10P and the various drawing parameters (draw speed, temperature, tension, cooling rate, etc.) dictate the final form of the co-doped fiber 10.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a wideband multimode co-doped optical fiber, comprising:
   a) forming a preform, the preform comprising:
      i) a preform co-doped core having a preform core outer edge and comprising silica and co-doped with a first radially varying concentration of $GeO_2$ that decreases with the radial coordinate r out to the preform core outer edge and a second radially varying concentration of $Al_2O_3$ that increases with the radial coordinate r out to the preform core outer edge;
      ii) a preform cladding immediately surrounding the preform co-doped core and comprising silica, the preform cladding having an inner preform cladding region of relative refractive index $\Delta 2$, an intermediate preform cladding region having a relative refractive index $\Delta 3$ with a minimum value $\Delta 3_{MIN}$, and an outer preform cladding region having a relative refractive index $\Delta 4$, wherein the intermediate cladding region comprises a moat and wherein $\Delta 3_{MIN} < \Delta 2, \Delta 4$; and
   b) drawing the preform to form the wideband multimode co-doped optical fiber comprising a co-doped fiber core defined by the preform co-doped core and having a fiber core outer edge and a diameter in a range from 20 microns to 70 microns and having the first and second radially varying concentrations of $GeO_2$ and $Al_2O_3$ out to the fiber core outer edge, and a fiber cladding surrounding the co-doped fiber core and defined by the preform cladding and having a fiber inner cladding region having the relative refractive index $\Delta 2$, a fiber intermediate cladding region having the relative refractive index $\Delta 3$ with the minimum value $\Delta 3_{MIN}$, and a fiber outer cladding region having the relative refractive index $\Delta 4$, wherein the fiber intermediate cladding region comprises a moat and wherein $\Delta 3_{MIN} < \Delta 2, \Delta 4$; and
   c) wherein the wideband multimode co-doped optical fiber has a wavelength band $\Delta \lambda$ of at least 100 nm having a peak wavelength $\lambda_P$ in a wavelength range from 800 nm to 1200 nm and a bandwidth $BW \leq 5$ GHz·km.

2. The method according to claim 1, further comprising forming the preform using a deposition process selected from the group of deposition processes comprising: outside vapor deposition, modified chemical vapor deposition, and plasma chemical vapor deposition.

3. The method according to claim 1, wherein the co-doped fiber core has a radial concentration of $GeO_2$ defined by a first alpha value $\alpha_1$ in the range from $2.0 \leq \alpha_1 \leq 2.2$ and a radial concentration of $Al_2O_3$ defined by a second alpha value $\alpha_2$ in the range from $2.0 \leq \alpha_2 \leq 2.6$.

4. The method according to claim 1, wherein the wavelength band $\Delta \lambda$ is a range from 100 nm to 300 nm.

* * * * *

UNITED STATES PATENT AND TRADEMARK OFFICE
CERTIFICATE OF CORRECTION

| | | |
|---|---|---|
| PATENT NO. | : 11,287,568 B2 | Page 1 of 1 |
| APPLICATION NO. | : 17/239923 | |
| DATED | : March 29, 2022 | |
| INVENTOR(S) | : Dana Craig Bookbinder et al. | |

It is certified that error appears in the above-identified patent and that said Letters Patent is hereby corrected as shown below:

In the Claims

In Column 14, Line 38, in Claim 1, delete "$BW \leq 5$" and insert -- $BW \geq 5$ --.

Signed and Sealed this
Twenty-eighth Day of June, 2022

Katherine Kelly Vidal
*Director of the United States Patent and Trademark Office*